United States Patent [19]

Aonuma et al.

[11] Patent Number: 5,716,433
[45] Date of Patent: Feb. 10, 1998

[54] COATING LIQUID AND METHOD FOR FORMING SILVER FILM ON SUBSTRATE USING SAME

[75] Inventors: Hidenori Aonuma, Matsusaka; Shigeki Morimoto, Ureshino, both of Japan

[73] Assignee: Central Glass Company, Limited, Yamaguchi, Japan

[21] Appl. No.: 719,602

[22] Filed: Sep. 26, 1996

[30] Foreign Application Priority Data

Sep. 28, 1995 [JP] Japan .................................. 7-250788

[51] Int. Cl.⁶ ........................................ C23C 18/31
[52] U.S. Cl. ................................. 106/1.19; 427/426
[58] Field of Search ........................ 106/1.19; 427/426

[56] References Cited

U.S. PATENT DOCUMENTS 3,983,266  9/1976  Bahls ......................... 106/1.19
4,463,030  7/1984  Deffeyes et al. ............. 106/1.19
4,925,491  5/1990  Perovetz et al. ............ 106/1.19

Primary Examiner—Helene Klemanski
Attorney, Agent, or Firm—Evenson, McKeown, Edwards & Lenahan, PLLC

[57] ABSTRACT

The invention relates to a coating liquid for forming a silver film on a substrate. The coating liquid includes a first ammoniacal aqueous solution containing silver nitrate and a second aqueous solution containing a reducer, a strong alkali, and at least one member selected from the group consisting halides and water-soluble proteins. The first and second aqueous solutions are reacted for forming the silver film on the substrate. The silver film formed from the coating liquid is fine and in texture, is superior in adhesion to the substrate, and enables a precise reflection image.

9 Claims, No Drawings

1

COATING LIQUID AND METHOD FOR FORMING SILVER FILM ON SUBSTRATE USING SAME

BACKGROUND OF THE INVENTION

The present invention relates to coating liquids for forming a silver film on a substrate, and methods for forming a silver film on a substrate, using the coating liquids. On the silver film, there are formed a copper film and then a corrosion-resistant resin film to produce a mirror.

It is known to form a silver film on a substrate by bringing a first ammoniacal aqueous solution containing silver nitrate and a second aqueous solution containing a reducer and a strong alkali into contact with each other on the substrate. By this contact, the first and second aqueous solutions are reacted, so that silver is deposited on the substrate. The silver film is formed by this deposition. Examples of the reducer are sodium gluconate, glucitol, grape sugar (D-glucose), tartaric acid, and formaldehyde. Examples of the strong alkali are sodium hydroxide and potassium hydroxide. However, it is difficult by the conventional method to efficiently form a silver film that is fine and dense in texture, uniform in thickness, and superior in adhesion to the substrate. In fact, silver colloid aggregates (hereinafter referred to as "silver mud", too) are formed on the substrate during the reaction between the first and second aqueous solutions, and these aggregates do not stick to the substrate. That is, silver becomes inferior in adhesion to the substrate. Thus, it is not possible to efficiently form on a substrate a silver film that is fine and dense in texture and uniform in thickness.

SUMMARY OF THE INVENTION

It is therefore an object of the present invention to provide a coating liquid for forming on a substrate a silver film that is fine and dense in texture, is superior in adhesion to the substrate, and enables a precise reflection image.

It is another object of the present invention to provide a method for forming such silver film on a substrate, using the coating liquid.

According to a first aspect of the present invention, there is provided a coating liquid for forming a silver film on a substrate, said coating liquid comprising:

a first ammoniacal aqueous solution containing silver nitrate; and a second aqueous solution containing a reducer, a strong alkali, and at least one alkali halide, wherein said first and second aqueous solutions are reacted for forming said silver film on said substrate.

According to a second aspect of the present invention, there is provided a coating liquid for forming a silver film on a substrate, said coating liquid comprising:

a first ammoniacal aqueous solution containing silver nitrate; and a second aqueous solution containing a reducer, a strong alkali, and at least one water-soluble protein, wherein said first and second aqueous solutions are reacted for forming said silver film on said substrate.

According to a third aspect of the present invention, there is provided a coating liquid for forming a silver film on a substrate, said coating liquid comprising:

a first ammoniacal aqueous solution containing silver nitrate; and a second aqueous solution containing a reducer, a strong alkali, at least one alkali halide, and at least one water-soluble protein, wherein said first and second aqueous solutions are reacted for forming said silver film on said substrate.

According to a fourth aspect of the present invention, there is provided a method for forming a silver film on a substrate, using a coating liquid including a first ammoniacal aqueous solution containing silver nitrate, and a second aqueous solution containing a reducer, a strong alkali, at least one selected from the group consisting of alkali halides and water-soluble proteins, said method comprising the following sequential steps of:

(a) bringing a clean surface of said substrate into contact with a stannous chloride solution that has been acidified by hydrochloric acid; and (b) bringing said first and second aqueous solutions into contact with each other on said clean surface of said substrate for forming thereon said silver film.

According to the present invention, a silver film formed on a substrate is fine and dense in texture, is superior in adhesion to the substrate, and enables a precise reflection image.

DESCRIPTION OF THE PREFERRED EMBODIMENTS

A coating liquid according to the present invention for forming a silver film on a substrate will be described in the following.

As stated above, a coating liquid according to the present invention comprises a first ammoniacal aqueous solution containing silver nitrate. This aqueous solution contains ammonium hydroxide. The coating liquid further comprises a second aqueous solution containing a reducer and a strong alkali. Examples of the reducer are sodium gluconate, glucitol, grape sugar CD-glucose), tartaric acid, and formaldehyde. Examples of the strong alkali are sodium hydroxide, potassium hydroxide, barium hydroxide, and calcium hydroxide.

It is an important feature of the present invention that the second aqueous solution further contains at least one selected from the group consisting of alkali halides and water-soluble proteins. In other words, the second aqueous solution contains at least one alkali halide, or at least one water-soluble protein, or both of at least one alkali halide and at least one water-soluble protein. Examples of the at least one alkali halide are KI, NaI, KBr, NaBr, KCL and NaCL. Examples of the at least one water-soluble protein are casein and gelatin. By using a suitable mount of at least one alkali halide, unstable hydrophobic silver colloids are covered therewith, in the reaction between the first and second aqueous solutions. With this, hydrophobic silver colloids become stable in the aqueous solution mixture and thus do not gather to form aggregates. That is, at least one alkali halide serves as a protective colloid to prevent the occurrence of silver mud. Thus, silver is substantially improved in adhesion to the substrate. Furthermore, at least one water-soluble protein also serves as a protective colloid to prevent the occurrence of silver mud. If too much mount of at least one alkali halide is used, silver mud may be formed. With this, the silver film may not efficiently ,be formed, and thus the mirror quality may be damaged.

In the invention, the silver nitrate concentration of the first aqueous solution is preferably from 0.01 to 1 moL/L. For example, it may be about 0.1 moL/L. The mounts of at least one alkali halide and of at least one Water-soluble protein are adjusted depending on the amount of silver nitrate. In fact, at least one alkali halide and at least one water-soluble protein are respectively preferably in amounts of 1–30 mg and 70–1,200 mg per 0.1 tool of silver nitrate contained in the first aqueous solution. These ranges are respectively preferable, even if both of at least one alkali halide and at least one water-soluble protein are contained in the second aqueous solution. With these ranges, silver is improved in adhesion to the substrate.

In the following, a method for forming a silver film on a substrate, using the coating liquid will be described in accordance with the present invention. In a preliminary step, it is preferable in an industrial scale production that a plurality of substrates (e.g., glass plates) that have already cleaned are continuously transported to a place where the silver film is formed. Then, in the step (a), a substrate is subjected to a preliminary treatment by bringing a clean surface of the substrate into contact with a stannous chloride solution that has been acidified by hydrochloric acid. Then, in the step (b), the first and second aqueous solutions are brought into contact with each other on the substrate's clean surface for forming thereon the silver film. With this reaction between the first and second aqueous solutions, the $Ag^+$ ion is reduced to metallic silver. With this reduction, metallic silver is deposited on the substrate, and thus the silver film is formed thereon. The step (b) is conducted, for example, by spraying the first and second aqueous solutions at the same time onto the substrate (e.g., transparent glass plate). In the step (b), the ratio by volume of the first aqueous solution to the second aqueous solution, which are applied to the unit area of substrate, is not particularly limited. For example, this ratio may be about 1:1 or from ½:1 to 1:½.

In the step (b), the reaction between the first and second aqueous solutions proceeds for about 40 seconds to form a silver film on substrate. Even after about 40 seconds lapses, the reaction proceeds slowly. If the reaction is allowed to proceed for too much period of time, the silver film surface may become rough. Unlike the present invention, if neither at least one alkali halide nor at least water-soluble protein is contained in the second aqueous solution, the reaction therebetween rapidly proceeds for about 20 seconds to form a silver film on substrate. After about 20 seconds lapses, the reaction hardly proceeds any more. If the reaction is made to proceed for much more period of time, the silver film's surface becomes rough by the precipitation of coarse silver colloids.

In the invention, it is preferable to provide the step (c) between the steps (a) and (b). In the step (c), a third ammoniacal aqueous solution containing silver nitrate is brought into contact with the substrate's clean surface. The third solution preferably contains silver nitrate in an mount of from 1/10 to 1/100 that of silver nitrate contained in the first aqueous solution. Thus, the third solution has, for example, a silver nitrate concentration of about 0.01 moL/L. By providing the step (c), the silver film becomes more uniform in thickness. In particular, the silver film becomes considerably uniform in thickness, in case that the first, second and third aqueous solutions are respectively applied to the substrate by moving the corresponding spray guns in a reciprocative manner.

According to the present invention, it becomes possible to efficiently form on a substrate a silver film that is fine and dense in texture and uniform in thickness by using the coating liquid.

In the production of a mirror, a copper film is formed on the silver film by a chemical metal plating method that is similar to that of the present invention. Then, a resin film is formed on the copper film to produce the mirror.

The present invention will be illustrated with the following nonlimitative examples.

EXAMPLE 1

At first, a first ammoniacal aqueous solution was prepared by mixing together water, silver nitrate and 28 wt % ammonium hydroxide aqueous solution such that the first solution contained 12 g (0.07 moL) of silver nitrate and 21 mL of the ammonium hydroxide aqueous solution per liter of the first aqueous solution.

Separately, each second aqueous solution was prepared by mixing together water, sodium gluconate, sodium hydroxide and an additive such that the second solution contained 0.015 moL of sodium gluconate, 8.4 g of sodium hydroxide and the additive in an amount shown in Table 1, per liter of the second aqueous solution.

Then, a silver film was formed on a clear glass plate, using the first and second aqueous solutions, as follows. At first, a clear glass plate having a temperature of 22°–24° C. was transported at a speed of 4.0 m/min to a place where a silver film is formed thereon. At this place, the glass plate was subjected to a preliminary treatment by bringing the glass plate into contact with a stannous chloride solution that had been acidified by hydrochloric acid. Then, the first and second aqueous solutions were respectively sprayed, at a rate of 131 mL per $m^2$ of the glass plate, onto the glass plate, from a pair of spray guns, while the spray guns were moved in a reciprocative manner along the width (minor side) of the glass plate, thereby allowing the first and second aqueous solutions to react with each other to form a silver film. The period of time for this reaction was set to 60 seconds. In other words, when 60 seconds has lapsed, the coated glass plate was washed and then dried. In this way, test samples Nos. 1–26 were prepared (see Table 1). For example, as shown in Table 1, test sample No. 1 was prepared by using KI as the additive such that the KI concentration of the second aqueous solution was 1 mg/L.

All of the test samples Nos. 1–26 (see Table 1) were observed with a scanning electron microscope to examine the silver film's texture with respect to its fineness and denseness. In this observation, the test samples Nos. 1–2, 6–19 and 22–24 were found to have textures equivalent to or somewhat superior to that of the test sample of the aftermentioned Comparative Example 1 in which the additive was omitted. As mentioned hereinafter, the test sample of Comparative Example 1 was found to have a very good texture. The test samples Nos. 3–5, 20–21 and 25–26 were found to have textures somewhat inferior to that of the test sample of Comparative Example 1.

For each test sample, there was determined "the percentage of silver adhesion" defined as being the amount expressed by % of silver adhered to the glass plate, based on the total amount of silver sprayed to the glass plate. The results of this determination are shown in Table 1. It is understood that all the results of the test samples Nos. 1–26 of Example 1 were superior to that of Comparative Example 1.

TABLE 1

| Test Sample Nos. of Example 1 | Additive (mg/L) of Second Aqueous Solution | Percentage of Silver Adhesion (%) |
| --- | --- | --- |
| 1 | KI (1) | 50 |
| 2 | KI (2) | 62 |
| 3 | KI (4) | 65 |
| 4 | KI (8) | 72 |
| 5 | KI (16) | 70 |
| 6 | Gelatin (50) | 58 |
| 7 | Gelatin (100) | 58 |
| 8 | Gelatin (200) | 65 |
| 9 | Gelatin (400) | 68 |

TABLE 1-continued

|  | Additive (mg/L) of Second Aqueous Solution | Percentage of Silver Adhesion (%) |
|---|---|---|
| 10 | Gelatin (800) | 65 |
| 11 | Sodium Caseinate (50) | 52 |
| 12 | Sodium Caseinate (100) | 55 |
| 13 | Sodium Caseinate (200) | 55 |
| 14 | Sodium Caseinate (400) | 57 |
| 15 | Sodium Caseinate (800) | 60 |
| 16 | KI (1) + Gelatin (50) | 64 |
| 17 | KI (2) + Gelatin (100) | 71 |
| 18 | KI (3) + Gelatin (100) | 75 |
| 19 | KI (5) + Gelatin (100) | 75 |
| 20 | KI (5) + Gelatin (300) | 71 |
| 21 | KI (8) + Gelatin (800) | 71 |
| 22 | KI (1) + Sodium Caseinate (50) | 60 |
| 23 | KI (2) + Sodium Caseinate (100) | 66 |
| 24 | KI (3) + Sodium Caseinate (200) | 76 |
| 25 | KI (5) + Sodium Caseinate (500) | 72 |
| 26 | KI (8) + Sodium Caseinate (800) | 70 |
| Com. Ex. 1 |  | 40 |

COMPARATIVE EXAMPLE 1

In this comparative example, Example 1 was repeated except in that the additive was omitted in the preparation of the second aqueous solution.

By the observation with SEM, the test sample's silver film was found to have a very good texture. The result of determination of the percentage of silver adhesion is shown in Table 1.

EXAMPLE 2

In this example, Example 1 was repeated except in that 0.015 tool of sodium gluconate was replaced by 0.015 tool of glucitol, and that the amounts of the additive were changed as shown in Table 2.

By the observation with SEM, all of the test sample Nos. 27–45 were found to have silver film's textures that are approximately equivalent to that of the after-mentioned Comparative Example 2. As is described hereinafter, the test sample of Comparative Example 2 was found to be good in silver film's texture, but somewhat inferior to that of Comparative Example 1 therein.

The results of determination of the percentage of silver adhesion is shown in Table 2. It is understood that all the results of the test samples Nos. 27–45 of Example 2 were superior to that of Comparative Example 2.

TABLE 2

|  | Additive (mg/L) of Second Aqueous Solution | Percentage of Silver Adhesion (%) |
|---|---|---|
| Test Sample Nos. of Example 2 |  |  |
| 27 | KI (1) | 73 |
| 28 | KI (4) | 78 |
| 29 | KI (16) | 72 |
| 30 | Gelatin (50) | 65 |
| 31 | Gelatin (300) | 70 |
| 32 | Gelatin (500) | 63 |
| 33 | Sodium Caseinate (50) | 65 |
| 34 | Sodium Caseinate (200) | 70 |
| 35 | Sodium Caseinate (500) | 63 |

TABLE 2-continued

|  | Additive (mg/L) of Second Aqueous Solution | Percentage of Silver Adhesion (%) |
|---|---|---|
| 36 | KI (1) + Sodium Caseinate (50) | 72 |
| 37 | KI (2) + Sodium Caseinate (100) | 72 |
| 38 | KI (3) + Sodium Caseinate (200) | 70 |
| 39 | KI (5) + Sodium Caseinate (400) | 68 |
| 40 | KI (5) + Sodium Caseinate (500) | 64 |
| 41 | KI (1) + Gelatin (50) | 72 |
| 42 | KI (2) + Gelatin (100) | 73 |
| 43 | KI (3) + Gelatin (200) | 71 |
| 44 | KI (5) + Gelatin (400) | 68 |
| 45 | KI (5) + Gelatin (500) | 64 |
| Com. Ex. 2 |  | 60 |

EXAMPLE 3

In this example, Example 1 was modified as follows. As the first modification, a third ammoniacal aqueous solution was sprayed, at a rate of 96 mL per $m^2$ of the glass plate, onto the glass plate, from a spray gun, between the preliminary treatment of a clear glass plate and the spraying of the first and second aqueous solutions. The third aqueous solution was prepared by mixing together water, silver nitrate and 28 wt % ammonium hydroxide aqueous solution such that the third solution contained 1.2 g (0.007 moL) of silver nitrate and 2.1 mL of the ammonium hydroxide aqueous solution per liter of the third aqueous solution.

As the second modification, the second aqueous solution was prepared by using an additive of a total of 5 mg of potassium iodide and 100 mg of sodium caseinate.

The result of determination of the percentage of silver adhesion was 75%. The thickness of the silver film was considerably more uniform, as compared with that of the following Example 4. Thus, the silver film of Example 3 is believed to enable a precise reflection image.

EXAMPLE 4

In this example, Example 3 was repeated except in that the spraying of the third ammoniacal aqueous solution was omitted.

The result of determination of the percentage of silver adhesion was almost the same as that of Example 3. There was found an unevenness of the silver film thickness. This is believed to have been caused by the reciprocating movement of the spray guns. There was further found a spotted unevenness of the silver film thickness.

What is claimed is:

1. A coating liquid for forming a silver film on a substrate, said coating liquid comprising:

a first ammoniacal aqueous solution containing silver nitrate; and a second aqueous solution containing a reducer, a strong alkali, and at least one alkali halide, wherein said first and second aqueous solutions are reacted for forming said silver film on said substrate.

2. A coating liquid according to claim 1, wherein said at least one alkali halide is in an amount of 1–30 mg per 0.1 tool of said silver nitrate, and wherein said first and second aqueous solutions are brought into contact with each other on said substrate for forming said silver film on said substrate.

3. A coating liquid for forming a silver film on a substrate, said coating liquid comprising:

a first ammoniacal aqueous solution containing silver nitrate; and a second aqueous solution containing a reducer, a strong alkali, and at least one water-soluble protein, wherein said first and second aqueous solutions are reacted for forming said silver film on said substrate.

4. A coating liquid according to claim 3, wherein said at least one water-soluble protein is in an mount of 70–1,200 mg per 0.1 moL of said silver nitrate, and wherein said first and second aqueous solutions are brought into contact with each other on said substrate for forming said silver film on said substrate.

5. A coating liquid for forming a silver film on a substrate, said coating liquid comprising:

a first ammoniacal aqueous solution containing silver nitrate; and a second aqueous solution containing a reducer, a strong alkali, at least one alkali halide, and at least one water-soluble protein, wherein said first and second aqueous solutions are reacted for forming said silver film on said substrate.

6. A coating liquid according to claim 5, wherein said at least one alkali halide and at least one water-soluble protein are respectively in mounts of 1–30 mg and of 70–1,200 mg per 0.1 tool of said silver nitrate, and wherein said first and second aqueous solutions are brought into contact with each other on said substrate for forming said silver film on said substrate.

7. A method for forming a silver film on a substrate, using a coating liquid including a first ammoniacal aqueous solution containing silver nitrate, and a second aqueous solution containing a reducer, a strong alkali, at least one selected from the group consisting of alkali halides and water-soluble proteins, said method comprising the following sequential steps of:

(a) bringing a clean surface of said substrate into contact with a stannous chloride solution that has been acidified by hydrochloric acid; and (b) bringing said first and second aqueous solutions into contact with each other on said clean surface of said substrate for forming thereon said silver film.

8. A method according to claim 7, wherein, between the steps (a) and (b), a third ammoniacal aqueous solution containing silver nitrate is brought into contact with said clean surface of said substrate.

9. A method according to claim 8, wherein said third aqueous solution contains said silver nitrate in an amount of from $1/10$ to $1/100$ that of said silver nitrate contained in said first aqueous solution.

* * * * *